United States Patent [19]

Shattuck

[11] Patent Number: 5,076,044
[45] Date of Patent: Dec. 31, 1991

[54] MOWING DEVICE

[76] Inventor: Thomas G. Shattuck, R.R. 2, P.O. Box 818, Waukee, Iowa 50263

[21] Appl. No.: 614,610

[22] Filed: Nov. 16, 1990

[51] Int. Cl.⁵ ............................................. A01D 75/30
[52] U.S. Cl. ............................................. 56/7; 56/117
[58] Field of Search ................. 56/7, 11.6, 13.8, 13.6, 56/DIG. 3, DIG. 9, DIG. 10; 464/117, 172

[56] References Cited

U.S. PATENT DOCUMENTS

| | | | |
|---|---|---|---|
| 3,148,517 | 9/1964 | Kinser | 464/117 |
| 3,224,176 | 12/1965 | Taylor | 56/7 |
| 3,483,683 | 12/1969 | McCanse | 464/117 X |
| 3,908,398 | 9/1975 | Braunberger | 464/117 X |
| 4,121,436 | 10/1978 | Garrison | 464/117 |
| 4,161,858 | 7/1979 | Gerrits | 56/DIG. 10 |
| 4,178,744 | 12/1979 | Allely et al. | 56/13.6 X |

Primary Examiner—William P. Neuder
Attorney, Agent, or Firm—Zarley, McKee, Thomte, Voorhees & Sease

[57] ABSTRACT

A mowing device includes an elongated frame having a plurality of reel mowers mounted thereto. A drive pulley and a driven pulley are rotatably mounted to the frame and have a pulley belt trained there around. Interconnecting the driven pulley with the reel mower is a linking shaft having universal joints at its opposite ends. One of the universal joints is connected to the driven pulley, and the other of the universal joints is connected to the shaft of the reel mower. The two universal joints and the linking shaft permit the reel mower to float upon the terrain being mowed without interfering with the alignment of the drive pulley and the driven pulley.

4 Claims, 3 Drawing Sheets

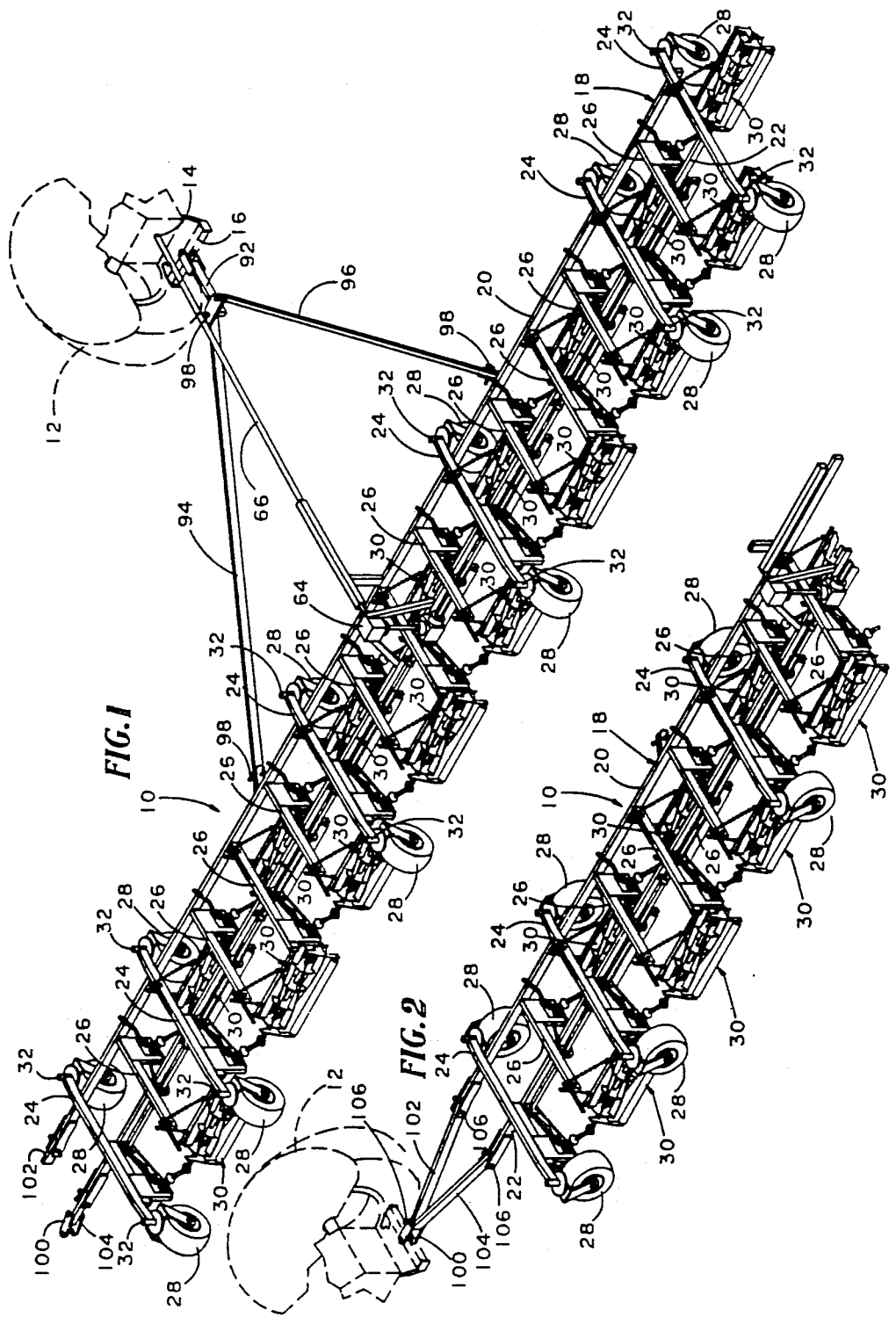

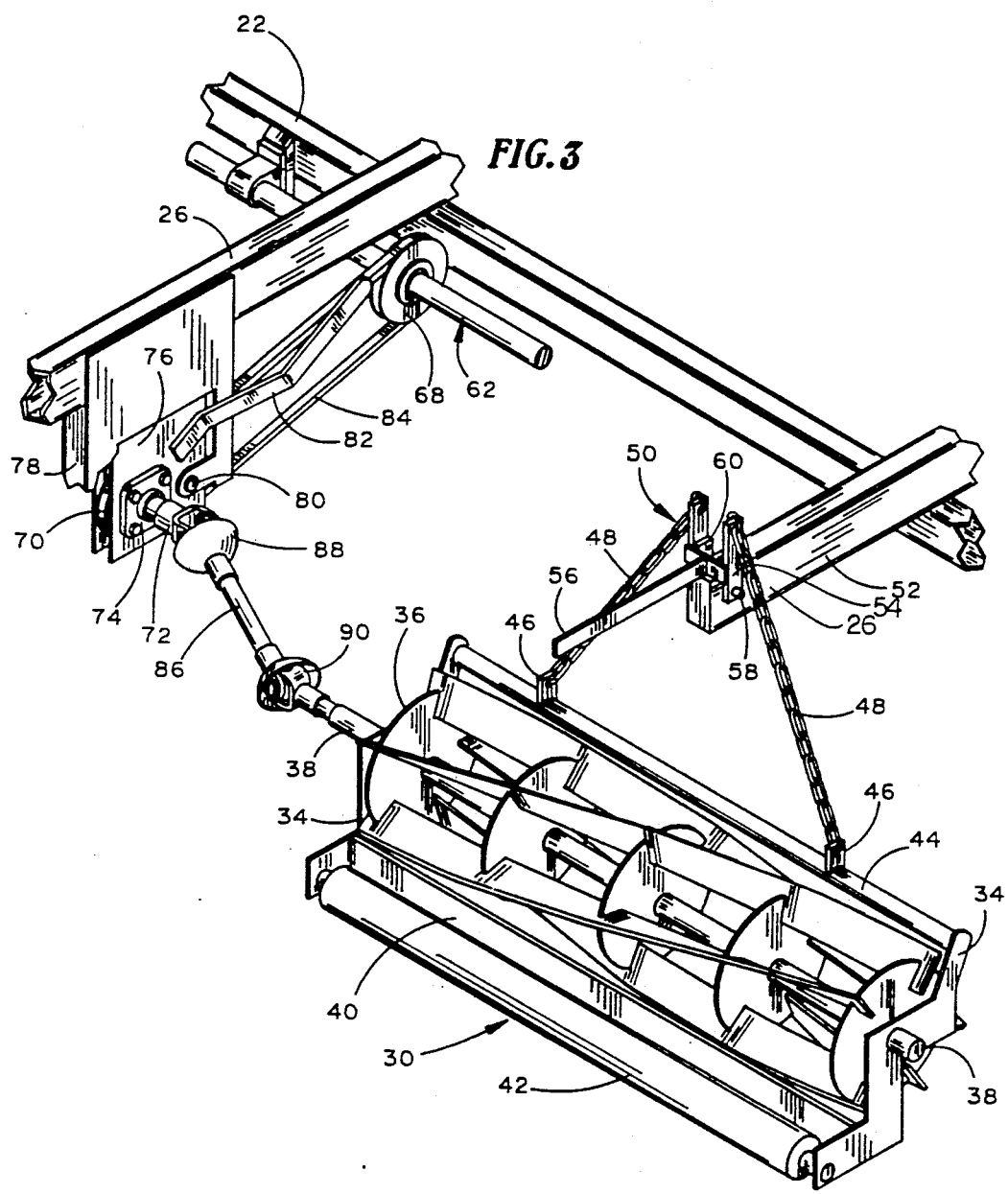

MOWING DEVICE

BACKGROUND THE INVENTION

This invention relates to a mowing device, and particularly to a mowing device including a large number of real mowers mounted on an elongated frame.

Large gang mowers have been utilized in applications where large areas are to be mowed, such as on golf courses or on sod farms. An example of such a gang mowing device is sold by Jerry Clipper, Inc., 5447 Stillwater Blvd. North, Stillwater, Minn. 55082 under the model designation GR-9 and under the trademark "The Jerry Clipper". This prior art device includes an elongated frame having a plurality of reel mowers mounted thereto. An elongated drive shaft on the frame has a plurality of pulleys thereon. Each of the mowers has a pulley directly mounted thereto, and a pulley belt is trained around one of the pulleys on the drive shaft and the pulley which is directly attached to the reel mower.

Certain problems have been encountered with the pulley and belt arrangement described above. The reel mower is adapted to roll directly on the ground, and during the mowing operation, the reel mower moves and changes angles as it floats along the terrain of the ground. As a result of this motion, the belt trained around the pulley on the mower sometimes comes off and has to be retrained around the pulley. This can be a cumbersome task when large numbers of reel mowers are mounted on the device. The operator can spend a great deal of time replacing belts which have come off as a result of the undulating action of the mowers.

Another difficulty is encountered with present devices in being able to adjust the reels relative to their respective blades. In order to make this adjustment, it is necessary to disconnect the reel from its drive belt so that the reel will spin freely during adjustment. In present devices, disconnection of the reel from its drive belt for reel adjustment and reattaching the drive belt after reel adjustment, are difficult and time consuming tasks.

Therefore, a primary object of the present invention is the provision of an improved mowing device.

A further object of the present invention is the provision of an improved mowing device which provides an improved pulley and belt drive system for driving the reel mowers on the device.

A further object of the present invention is the provision of an improved mowing device which provides a universal linkage for driving the reel mowers so that the reel mowers can move and undulate as they roll along the ground without interfering with the driving system for the mower.

A further object of the present invention is the provision of an improved mowing device which can be towed in a direction perpendicular to its longitudinal axis during the time that the mowing is being accomplished, and which can be towed in the direction of its longitudinal axis for transporting.

A further object of the present invention is the provision of an improved mowing device having an improved drive system which permits belts to be removed and replaced easily.

A further object of the present invention is the provision of an improved mowing device which permits the drive belts to be loosened for adjustment of the reels relative to their respective blades.

A further object of the present invention is the provision of an improved mowing device which is economical to manufacture, durable in use, and efficient in operation.

SUMMARY OF THE INVENTION

The present invention utilizes an elongated frame assembly having opposite ends. A plurality of pairs of ground engaging wheels are connected to the elongated frame at spaced apart intervals along the length thereof. The wheels are mounted by swivel mounts to the frame so that the wheels can swivel in any direction about a vertical axis. This permits the frame to be pulled in a direction transversed to its longitudinal axis during the mowing operation and permits the frame to be pulled in the direction of its longitudinal axis for transporting.

A plurality of reel mowers are mounted to the mower frame and are adapted to be moved from a first position, wherein they are suspended above the ground to a second position, wherein they roll upon the ground for cutting grass. Each of the reel mowers includes a rotatable reel having a reel shaft connected thereto.

The system for driving the reel mowers comprises an elongated drive shaft which is rotatably mounted to the frame and extends along the length thereof. On the drive shaft are a plurality of drive pulleys, with one drive pulley being provided for each reel mower. Also mounted on the frame are a plurality of driven pulleys which are spaced apart from and aligned with the drive pulleys. Trained around each drive pulley and driven pulley is a drive belt. The driven pulleys are rotatably mounted to the frame and include a driven pulley shaft which is attached thereto. A linking shaft interconnects the driven pulley shaft with the reel shaft of the reel mower. The linking shaft is connected by means of two universal joints, one at each of its opposite ends. One of the universal joints connects one end of the linking shaft to the driven pulley shaft, and the other universal joint connects the other end of the linking shaft to the reel shaft of the reel mower.

The drive shaft having the drive pulleys thereon is driven by means of a power take-off shaft which can be connected to the power take-off of a pulling tractor. The power take-off shaft is connected to a gear box which in turn is connected to the drive shaft for rotating the drive shaft. Thus, upon rotation of the drive shaft, the reels for each of the mowers are driven in a rotational direction for mowing the grass.

The advantage of the above drive system is that the reel mower can float and move along the ground in response to variations in the terrain without affecting the alignment of the driven pulley and the drive pulley. This is because the driven pulley and the drive pulley ar both rotatably mounted to the frame and are fixed in their positions relative to each other.

The two universal joints at the opposite ends of the linking shaft permit movement of the reel mower while the reel mower is still being driven without interfering with the alignment of the drive pulley and the driven pulley.

The driven pulley is mounted to a plate which is pivotally mounted to the frame. The plate may be rotated in a toggle like fashion so as to move the driven pulley from an operative position, wherein the pulley belt is tight to an inoperative position closer to the drive pulley so as to loosen the drive belt and permit removal and replacement of the drive belt. This also permits the reel to rotate freely for adjustment of its position relative to the cutting bar.

BRIEF DESCRIPTION OF THE DRAWINGS

FIG. 1 is a perspective view of the mower device of the present invention.

FIG. 2 is a partial perspective view similar to FIG. 1, but showing the mowing device rearranged for transporting in its longitudinal direction.

FIG. 3 is a detailed perspective view of one of the mower reels and the drive system for the mower reel.

DESCRIPTION OF THE PREFERRED EMBODIMENT

Figure 4:
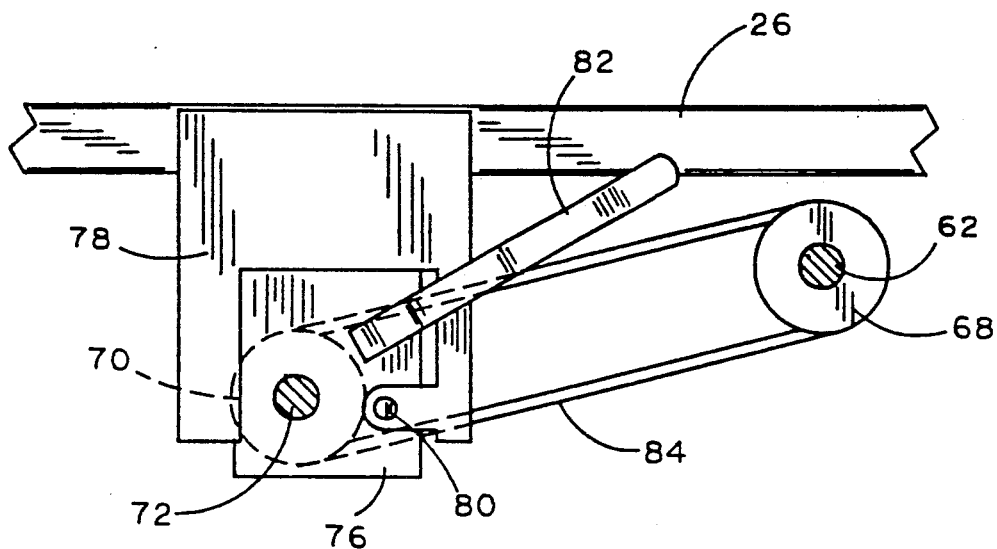
FIG. 4 is a detailed elevational view of the pulley system for driving the reel mower.

Referring to the drawings, the numeral 10 generally refers to the mowing device of the present invention. Device 10 is shown in FIG. 1 to be pulled by a tractor 12 having a power take-off 14 and a draw bar 16.

Mowing device 10 includes a frame assembly 18 which is comprised of a front frame member 20, a rear frame member 22, a plurality of wheel cross members 24, and a plurality of mower cross members 26. A plurality of ground engaging wheels 28 are mounted to the frame by means of swivel wheel mounts 32. This permits the wheels to swivel about a vertical axis so that the frame can be pulled in a direction perpendicular to its longitudinal axis as shown in FIG. 1 or in the same direction as its longitudinal axis as shown in FIG. 2.

Mounted to the frame assembly 18 are a plurality of reel mowers 30. The reel mowers are arranged in two lines, with the front line being staggered relative to the rear line so as to provide an uninterrupted mowing pattern along the length of the frame assembly 18. The detailed structure of each reel mower is shown in FIG. 3. Each reel mower 30 includes a reel frame 34 having a conventional mower reel 36 rotatably mounted thereto. The reel 36 includes a reel shaft 38 extending from its opposite ends. A blade holder 40 holds a blade (not shown) in conventional fashion, and a roller 42 is also rotatably mounted to the reel frame 34. Extending across the upper portion of the reel mower 30 is a lift bar 44 having a pair of ear flanges 46 thereon. Connected to each of the ear flanges 46 are a pair of chains 48 which extend upwardly and which are connected to a toggle lift mechanism 50. Mechanism 50 is rotatably mounted to a stub frame 52 which is integral with the frame assembly 18. Toggle mechanism 50 includes a U-shaped leg 54 which is rigidly connected to a lever 56 and which is pivoted about a fulcrum 58. Fulcrum 58 is provided by the pivotal connection of the toggle mechanism to ear flanges 60 which are fixed to the stub frame 52.

In the position shown in FIG. 3, the toggle mechanism 50 permits the reel mower 30 to be in its lowered position so that it rolls upon the terrain being mowed. However, rotation of toggle mechanism 50 in a counterclockwise direction by means of lever 56 will lift the mower so that it will be suspended above the ground for transporting.

Extending along the length of the frame assembly 18 and rotatably mounted thereto is a first drive shaft 62. Drive shaft 62 is connected to gear box 64 which in turn is driven by a second drive shaft 66 operatively connected to the power take-off of the tractor. Thus, rotation of drive shaft 66 causes the first drive shaft 62 to be rotated and driven by the power takeoff of the tractor.

Figure 5:
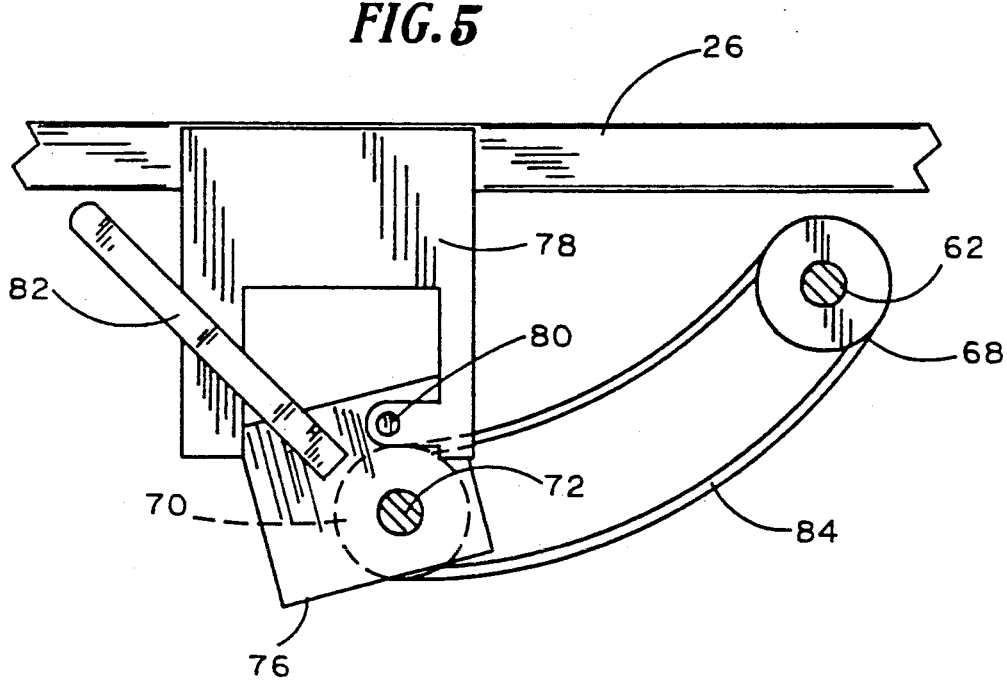
FIG. 5 is a view similar to FIG. 4, but showing the pulleys in their inoperative position wherein the drive belt is loosened.

Along the length of drive shaft 62 are a plurality of drive pulleys 68, each of which is intended for driving one of the reel mowers. Also mounted to frame assembly 18 is a driven pulley 70 which is aligned with drive pulley 68. Driven pulley 70 includes a driven shaft 72 extending therefrom, and it is rotatably mounted to a pulley mounting plate 76 by means of a bearing 74. Pulley mounting plate 76 is pivotally mounted to a plate frame 78 for pivotal movement about a pivotal axis 80. A lever 82 is also connected to pulley mounting plate 76 for causing the pivotal motion of the pulley mounting plate from its operative position shown in FIG. 4 wherein a pulley belt 84 is tightly trained around drive pulley 68 and driven pulley 70 to an inoperative position shown in FIG. 5, wherein the pulley 84 is loosened. This permits removal of the driven pulley 84 and also permits disconnection of the driven pulley 70 so that it will no longer be driven by the drive shaft 62.

A connecting link 86 is used to interconnect the driven shaft 72 of driven pulley 70 to the reel shaft 38 of the reel mower 30. One end of connecting link 86 is connected to the driven shaft 72 by means of a first U-joint 88. The opposite end of connecting link 86 is connected to the reel shaft 38 by means of a second U-joint 90. The use of the connecting link 86 and the two U-joints 88, 90 permits the reel mower to move in undulating fashion as it floats along the terrain being mowed, while at the same time prevents any interference of the alignment of the driven pulley 70 and the drive pulley 68.

Referring to FIG. 1, the frame assembly 18 is attached to the draw bar 16 by means of a first tongue 92 having a tongue strut 94 and another tongue strut 96 connected thereto and extending rearwardly to be connected to the frame assembly 18. A plurality of release pins 98 at the opposite ends of tongue struts 94, 96 permit the tongue assembly to be dismantled for transporting.

FIG. 2 illustrates a transporting tongue 100 for transporting the frame assembly 18 in its longitudinal direction for transporting. Tongue 100 includes two tongue struts 102, 104 each of which is pivotally connected at its opposite ends by means of pins 106. The pins 106 can be removed during the time that the mowing device is being used for mowing.

As can be seen in FIG. 1, strut members 102 and 104 can be stored within the hollow frame members 20, 22 during the mowing operation.

The present invention provides an improvement over prior devices in that it permits the reel mowers to float on the terrain without interfering with the alignment of the two drive pulleys. Thus, the pulley belt 84 remains in good contact with the drive pulleys and is not permitted to become misaligned and jump off the pulleys. The drive belts for each reel can be quickly loosened by pivoting levers 82. This permits the reels to be rotated freely during adjustment of the reels. Thus, it can be seen that the device accomplishes at least all of its stated objectives.

I claim:

1. A mowing device comprising:
    an elongated frame assembly having opposite ends and a longitudinal axis;
    an elongated drive shaft rotatably mounted to said frame assembly for rotation about a drive shaft axis approximately parallel to said longitudinal axis of said frame assembly;

a plurality of drive pulleys mounted to said drive shaft for rotation in the same direction as said drive shaft in response to rotation of said drive shaft;

a plurality of pairs of ground engaging wheels connected to said elongated frame at spaced apart intervals along the length thereof;

wheel swivel means connecting each of said wheels to said frame for swiveled movement about a vertical swivel axis;

a plurality of reel mowers, each having a mower frame, a reel rotatably mounted to said mower frame for rotation about a reel axis, and a reel shaft connected to said reel;

link means pivotally connecting each of said reel mowers to said frame for movement from a lower position adjacent the ground to a higher elevated position, said link means holding said mower with said reel axis extending approximately parallel to the longitudinal axis of said frame assembly and permitting limited movement of said reel axis out of parallel with said frame assembly;

a plurality of driven shafts each of which is rotatably mounted to said frame assembly for rotation about a driven shaft axis approximately parallel to the longitudinal axis of said frame assembly, each of said driven shafts being adjacent one of said mower assemblies;

a plurality of driven pulleys mounted on said driven shafts for rotation about said driven shaft axis;

a plurality of drive belts each of which is trained around one of said drive pulleys and one of said driven pulleys for transferring rotation of said drive shaft to said driven shafts;

a plurality of linking shafts, each of which includes opposite ends and each of which interconnects one of said driven shafts to one of said reel shafts for rotatably driving one of said reels;

first universal joint means interconnecting one of said opposite ends of each of said linking shaft to one of said driven shafts;

second universal joint means interconnecting the other of said opposite ends of each of said linking shafts to one of said reel shafts;

power means for rotatably driving said drive shaft which can cause rotation of each of said driven shafts, each causing rotation of the one of said linking shafts and the one of said reels connected thereto;

a plurality of mounting means, each movably mounting one of said driven pulleys to said frame assembly for movement between an operable position wherein said driven shaft of said one driven pulley is parallel to said drive shaft and one of said drive belts is drivingly trained around said one driven pulley and one of said drive pulleys on said drive shaft, to an inoperable position wherein said one driven pulley is moved toward said one drive pulley so as to loosen said one drive belt between said one drive pulley and said one driven pulley;

said linking shafts and said first and second universal joint means permitting said reel axis of said reel mower to change without causing said driven pulley axis to change.

2. A mowing device according to claim 1 wherein each of said pulley mounting means comprises a plate pivotally mounted to said frame assembly for pivotal movement about a toggle axis parallel to and spaced about from said driven shaft axis, said driven shaft being rotatably mounted to said plate, said plate being pivotal about said toggle axis to move said driven shaft axis between said operable and said inoperable positions.

3. A mowing device according to claim 1 wherein first tongue means are connected to said frame assembly and is adapted to be connected to a pulling vehicle for pulling said frame assembly in a direction perpendicular to said longitudinal axis of said frame assembly.

4. A mowing device according to claim 3 wherein second tongue means are attached to one end of said frame assembly and is adapted to be connected to a pulling vehicle for pulling said frame assembly in a direction parallel to said longitudinal axis of said frame assembly.

* * * * *